US009207348B2

United States Patent
Welker et al.

(10) Patent No.: US 9,207,348 B2
(45) Date of Patent: Dec. 8, 2015

(54) COLLISION AVOIDANCE FOR INSTRUMENTED PROBES DEPLOYED FROM A SEISMIC VESSEL

(75) Inventors: Kenneth E. Welker, Nesoya (NO); Ulrich Hemmerle, Vestfold (NO); Ottar Kristiansen, Oslo (NO); Morten Svendsen, Voyenenga (NO); Julian Edward (Ed) Kragh, Finchingfield (GB)

(73) Assignee: WESTERNGECO L.L.C, Houston, TX (US)

( * ) Notice: Subject to any disclaimer, the term of this patent is extended or adjusted under 35 U.S.C. 154(b) by 784 days.

(21) Appl. No.: 12/880,998

(22) Filed: Sep. 13, 2010

(65) Prior Publication Data

US 2012/0020185 A1 Jan. 26, 2012

Related U.S. Application Data

(63) Continuation-in-part of application No. 12/473,667, filed on May 28, 2009.

(60) Provisional application No. 61/242,457, filed on Sep. 15, 2009.

(51) Int. Cl.
*G01V 1/38* (2006.01)
*B63G 8/00* (2006.01)

(52) U.S. Cl.
CPC ............... *G01V 1/3826* (2013.01); *G01V 1/38* (2013.01); *G01V 1/3843* (2013.01); *B63G 8/001* (2013.01)

(58) Field of Classification Search
CPC ..... G01V 1/38; G01V 1/3826; G01V 1/3843; B63G 8/001

USPC .......... 367/15–20, 87–89, 902; 114/242, 244, 114/249–254

See application file for complete search history.

(56) References Cited

U.S. PATENT DOCUMENTS

| 3,794,965 | A | * | 2/1974 | Charske | 367/18 |
| 4,118,782 | A | * | 10/1978 | Allen et al. | 73/170.29 |
| 4,509,151 | A | | 4/1985 | Anderson | |
| 4,992,993 | A | | 2/1991 | Chambers | |
| 5,294,847 | A | | 3/1994 | Grossman et al. | |
| 5,856,954 | A | * | 1/1999 | Grall | 367/106 |
| 5,894,450 | A | | 4/1999 | Schmidt et al. | |
| 6,256,589 | B1 | * | 7/2001 | Gallotti Guimaraes | 702/18 |
| 6,474,254 | B1 | | 11/2002 | Ambs et al. | |
| 7,293,520 | B2 | * | 11/2007 | Hillesund et al. | 114/244 |
| 7,417,924 | B2 | | 8/2008 | Vigen et al. | |
| 7,496,000 | B2 | | 2/2009 | Vosburgh et al. | |

(Continued)

OTHER PUBLICATIONS

International Search Report and Written Opinion of PCT Application No. PCT/US2010/036468 dated Jan. 25, 2011: pp. 1-9.

(Continued)

*Primary Examiner* — Krystine Breier

(57) ABSTRACT

One embodiment of the invention concerns a probe that couples to a seismic vessel via a tow cable. When deploying probes from a seismic vessel that is towing source arrays and streamers, the probe and its tow cable can tangle with elements of the towed seismic spread. However, a cable guide may be used to lessen the risk for such entanglement by guiding the tow cable into the water at a distance removed from the seismic spread. Also, the probe may be steerable to steer the probe and tow cable away from the seismic spread. Other embodiments are described herein.

23 Claims, 7 Drawing Sheets

(56) References Cited

U.S. PATENT DOCUMENTS

| | | | |
|---|---|---|---|
| 7,796,466 | B2 | 9/2010 | Combee et al. |
| 2003/0074140 | A1 | 4/2003 | MacKay |
| 2008/0192570 | A1* | 8/2008 | Lennart Tenghamn et al. .............................. 367/17 |
| 2009/0092005 | A1 | 4/2009 | Goujon et al. |
| 2010/0045295 | A1* | 2/2010 | Mittet et al. ................... 324/334 |
| 2010/0185348 | A1 | 7/2010 | Webb |
| 2010/0302901 | A1 | 12/2010 | Welker et al. |
| 2012/0069702 | A1 | 3/2012 | Muyzert et al. |

OTHER PUBLICATIONS

Extended European Search Report of European Application No. 10781239.8 dated Feb. 14, 2013: pp. 1-12.
Anonymous, Automated Sound Velocity Profiler (ASVP), InterOcean systems, inc., Specification Sheet, 2010: pp. 1-2.
Anonymous, "Expendable Probes," Lockheed Martin Sippican, Product List, 2010: pp. 1-2, <www.sippican.com/contentmgr/showdetails.php/id/312>.
Anonymous, "Moving Vessel Profiler," ODIM Brook Ocean, Brochure/Product Details, 2008: pp. 1-9, <http://web.archive.org/web/20080225221946/http://www.brooke-ocean.com/mvp_main.html>.
Anonymous, "Sound Velocity Sensors & Profilers," Sound Velocity Sensors, Instruments, Profilers, SVP, Speed of Sound, Valeport, 2010: pp. 1-3.
Bertrand et al., "Seawater velocity variations and real-time reservoir monitoring," The Leading Edge, Apr. 2003: pp. 351-355.
Brittan et al., "Optimizing the removal of seismic interface noise," The Leading Edge, Feb. 2008: pp. 166-175.
Gulunay, "Two different algorithms for seismic interference noise attenuation," The Leading Edge, Feb. 2008: pp. 176-181.
Kommedal et al., "Annual Meeting Selection: A case of SI attenuation in 4D seismic data recorded with a permanently installed array," Geophysics, May-Jun. 2007, vol. 72(3): pp. Q11-Q14.
Krohn et al., "Introduction to this special section-Seismic Noise," The Leading Edge, Feb. 2008: pp. 163-165.
Lacombe et al., "Correcting for water-column variations," The Leading Edge, Feb. 2009: pp. 198-201.
"Seaglider Summary," Applied Physics Laboratory, University of Michigan, originally retrieved 2008: p. 1.
Sleeper et al., "OTC 18113: Bathymetric Mapping and High-Resolution Seismic Profiling by AUV in MC 118 (Gulf of Mexico)," Offshore Technology Conference, 2006: pp. 1-9.
"Slocum Glider," Webb Research Corporation, originally retrieved 2008: pp. 1-2, <http://web.arachive.org/web/20071024201851/http://www.webbresearch.com/slocum.htm>.
Smith, "Removal of Rig Reflection Energy from Seismic Data," InTouchSupport.com, retrieved Aug. 2009: pp. 1-2, <http://intouchsuupport.com/intouch/methodinvokerpage.cfm?caseid=4751351>.
Stojanovic, "Underwater Acoustic Communication," Encyclopedia of Electrical and Electronics Engineering, 1999: pp. 1-33, <http://www.mit.edu/~millitsa/resources/pdfs/ency.pdf>.
Tham, "Attenuation of seismic source noise reflected off the rigs & rig noise travelling through the water to receivers," InTouchSupport.com, retrieved Aug. 2009: pp. 1-2, <http://intouchsuupport.com/intouch/methodinvokerpage.cfm? caseid=4244776>.
Wang, "Autonomous Underwater Vehicle (AUV) Pat Planning and Adaptive On-board Routing for Adaptive Rapid Environmental Assessment," Massachusetts Institute of Technology, Doctoral Thesis, 2007: pp. 1-204.
Widditsch, "SPURV—The First Decade," Oct. 1973, Defense Technical Information Center: pp. 1-38.

* cited by examiner

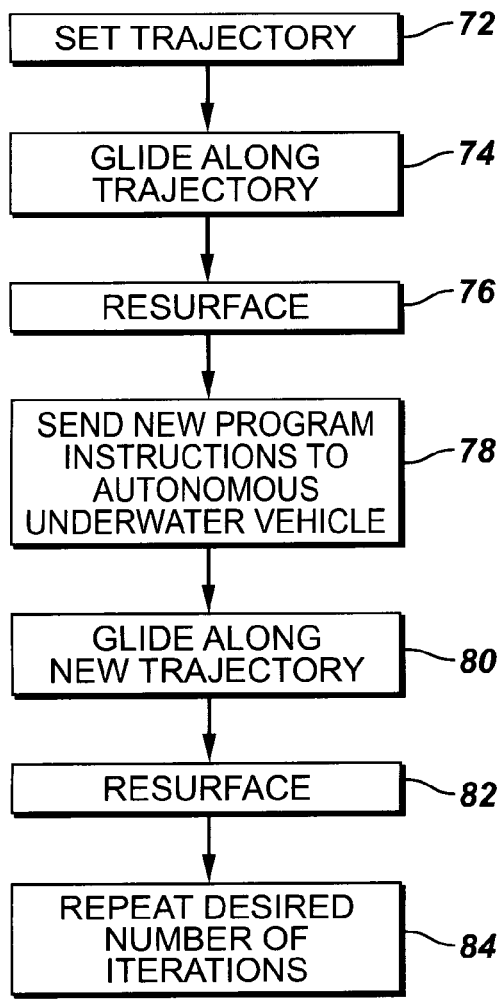
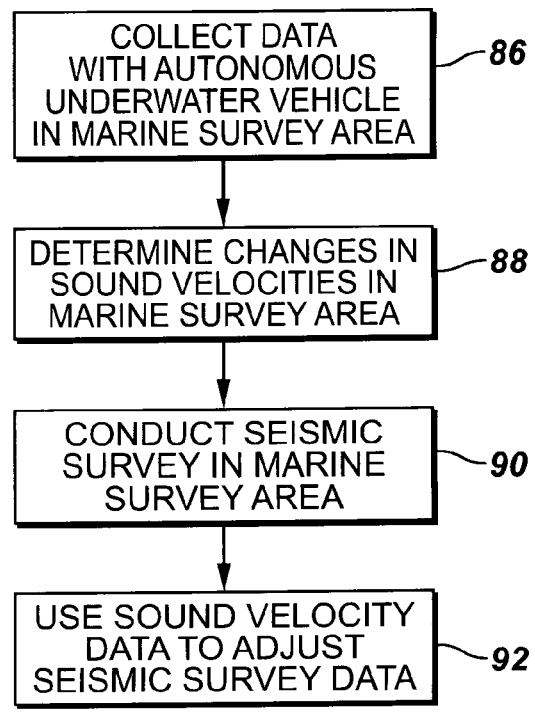

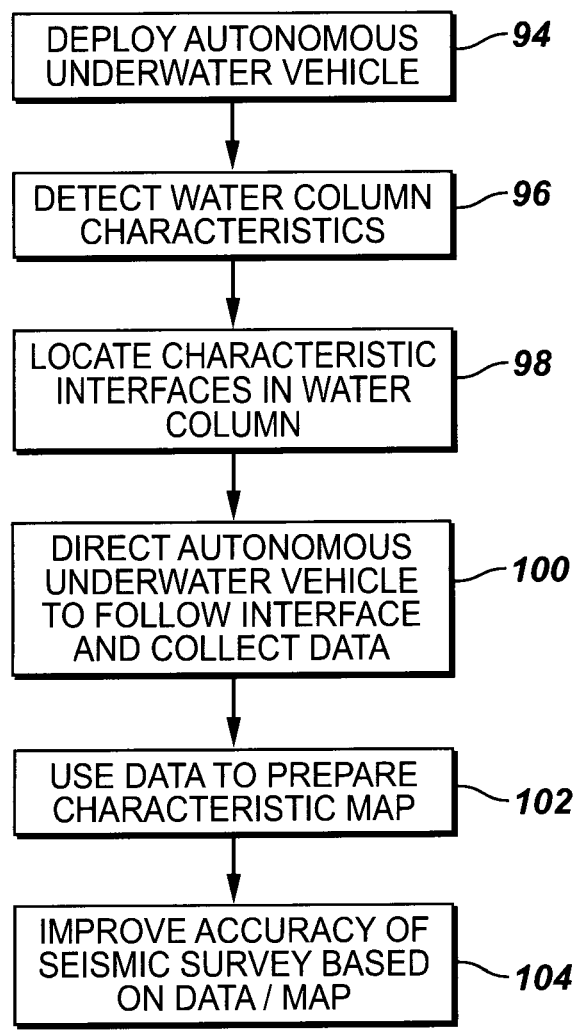

COLLISION AVOIDANCE FOR INSTRUMENTED PROBES DEPLOYED FROM A SEISMIC VESSEL

CROSS REFERENCE TO RELATED APPLICATIONS

This application claims priority to U.S. Provisional Patent Application No. 61/242,457 filed on Sep. 15, 2009 and entitled "COLLISION AVOIDANCE FOR INSTRUMENTED PROBES DEPLOYED FROM A SEISMIC VESSEL", the content of which is hereby incorporated by reference. Furthermore, this application is a continuation-in-part of the following U.S. Patent Application, of which this application claims the benefit of priority from: U.S. patent application Ser. No. 12/473,667 filed on May 28, 2009 and entitled "SYSTEM AND METHOD OF USING AUTONOMOUS UNDERWATER VEHICLE TO FACILITATE SEISMIC DATA ACQUISITION", the content of which is hereby incorporated by reference.

BACKGROUND

In a variety of marine environments, seismic surveys can be taken to gain a better understanding of geological formations beneath a body of water. Relatively large marine regions can be surveyed by a surface vessel or vessels towing seismic streamer cables through the water. Another vessel, or the same vessel, can be employed in providing a seismic source, such as a compressed air gun utilized to generate acoustic pulses in the water. The seismic source is used to generate energy that propagates down through the water and into the geological formation. Marine survey data on the geological formation can be obtained by detecting the energy reflected from interfaces between geological formations. Hydrophones are connected along the seismic streamer cables to detect the reflected energy.

Accurate collection of data by the hydrophones is affected by changes in characteristics of the water column, such as changes in sound velocity between regions of the water column in the survey area. The travel time of the reflected energy/signal through the water column is needed to accurately establish, for example, the depth of the target reflecting surface. Noting these changes are important in many situations such as, for example, when processing seismic data with three-dimensional (3D) and four-dimensional (4D) data processing, which includes 3D seismic data acquired at different times over the same area.

In some applications, sound velocity probes are dropped with varying frequency from a survey vessel during the seismic survey to collect data on sound velocity. The usefulness and frequency of the drops, however, can be limited by several factors, including operational safety considerations, risk of tangling the sound velocity probe line with the seismic spread equipment, requirements of the survey client, type of survey (e.g., 4D versus 3D), knowledge of the survey space, and time rate of sound velocity variation. Thus, sound velocity measurements are taken infrequently compared to the frequency of sound velocity change in time and space. However, in some situations probes may be used to measure sound velocity continuously from a moving vessel. Regardless, doing so still puts the probe, which is sometimes referred to as a "fish", close to the towed seismic array as the fish approaches the water surface where the fish and/or its cable can tangle with the seismic spread equipment.

SUMMARY

One embodiment of the invention concerns a probe that couples to a seismic vessel via a tow cable. When deploying probes from a seismic vessel that is towing source arrays and streamers, the probe and its tow cable can tangle with elements of the towed seismic spread. However, a cable guide may be used to lessen the risk for such entanglement by guiding the tow cable into the water at a distance removed from the seismic spread. Also, the probe may be steerable to steer the probe and tow cable away from the seismic spread. Other features will become apparent from the following description, drawings, and claims.

BRIEF DESCRIPTION OF THE DRAWINGS

Some embodiments of the invention are described with respect to the following figures:

FIG. 5 is a flowchart illustrating one example of a methodology for utilizing the autonomous underwater vehicle, according to an embodiment of the present invention;

FIG. 6 is a flowchart illustrating another example of a methodology for utilizing the autonomous underwater vehicle, according to an embodiment of the present invention;

FIG. 7 is a flowchart illustrating another example of a methodology for utilizing the autonomous underwater vehicle, according to an embodiment of the present invention;

DETAILED DESCRIPTION

Figure 1:
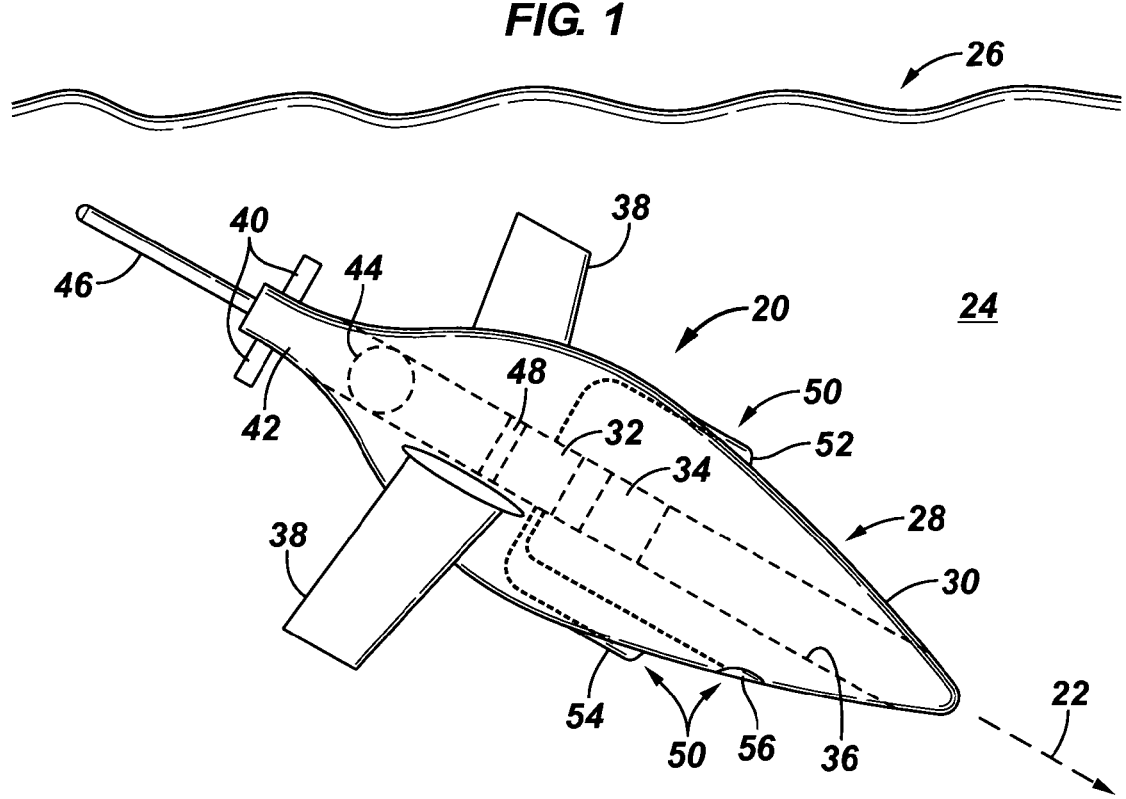
FIG. 1 is a schematic view of an autonomous underwater vehicle deployed along a trajectory underwater to collect data, according to an embodiment of the present invention.

In the following description, numerous specific details are set forth. However, it is understood that embodiments of the invention may be practiced without these specific details. Well-known circuits, structures, and techniques have not been shown in detail to avoid obscuring an understanding of this description. References to "one embodiment", "an embodiment", "example embodiment", "various embodiments" and the like indicate the embodiment(s) so described may include particular features, structures, or characteristics, but not every embodiment necessarily includes the particular features, structures, or characteristics. Further, some embodiments may have some, all, or none of the features (utilized in the same or differing orientations and orders) described for other embodiments. Also, as used herein "first", "second", "third" and the like describe a common object and indicate that different instances of like objects are being referred to. Such adjectives are not intended to imply the objects so described must be in a given sequence, either temporally, spatially, in ranking, or in any other manner.

An embodiment of the invention generally relates to a technique that can be used to improve the usefulness of seismic survey data. The system and methodology utilize an autonomous underwater vehicle to obtain data on water column characteristics in a seismic survey area. The data is then used (e.g., processed) with corresponding seismic data obtained during a seismic survey to improve, for example, the accuracy of the seismic data. In one embodiment, the autonomous underwater vehicle is programmed to sample water column characteristics that enable estimation of the time and space varying sound velocity of the water column in the seismic survey area.

The autonomous underwater vehicle is not physically coupled to any surface seismic vessels and moves independently underwater to desired regions of the seismic survey area. The autonomous underwater vehicle can be preprogrammed and/or programmed during operation to follow desired trajectories underwater. The underwater trajectories are selected to obtain data on the desired water column characteristics (e.g., sound velocity characteristics), which may vary throughout different regions of the water column. Data is transferred from the autonomous underwater vehicle to a desired collection location (e.g., to a processing/control system on a surface vessel). Similarly, data can be transferred from the surface vessel to the autonomous underwater vehicle. The transfer of data from the surface vessel to the autonomous underwater vehicle may be used to iteratively program the autonomous underwater vehicle to follow new paths through the water column. For example, the autonomous underwater vehicle may be iteratively programmed to follow water column characteristic interfaces, such as sound velocity interfaces.

According to one embodiment, the autonomous underwater vehicle is a glider programmed to glide along desired trajectories. Individual gliders or groups of gliders can be deployed in a seismic survey area and programmed to sample the water column. For example, the gliders may be programmed to detect water column characteristics indicative of sound velocities in the survey area. In some embodiments, data from the gliders is collected during surfacing; and data also can be downloaded to the glider during the same surfacing activity. In one embodiment, data is transmitted between the glider and a surface vessel via a satellite communication system, such as the Iridium satellite system. One example of a suitable type of glider is the "Seaglider" developed by the Applied Physics Laboratory-University of Washington in cooperation with the University of Washington School of Oceanography.

By way of example, the sampling trajectory selected for the glider may be directed from a global positioning system (e.g., Global Navigation Satellite System GNSS) starting point and by dead reckoning, inertial navigation measurements, altimeters, compasses, and with surface survey vessel acoustic methods, such as long baseline and short baseline measurement methods. In an alternate embodiment, communications also can be achieved through underwater acoustic and/or optical telemetry. Obtaining a position for the glider through active or passive acoustic distance measurement and subsequent communication to the glider allows an operator on the surface survey vessel to control the trajectory of the glider. The history of descent or ascent enables an operator to download information regarding an updated desired path for the glider. The process of updating the glider path also can be automated according to specific objectives for changing the glider trajectory. For example, objectives for changing the glider trajectory may include avoiding obstructions and other vehicles (e.g., surface vessels or seismic spread equipment deployed to acquire the survey data), which may be moving through the survey area during a scheduled surfacing of the glider.

In one embodiment, the autonomous underwater vehicle (e.g., glider) is used to map the sound velocity of the survey area for geophysical signal propagation. Because the autonomous underwater vehicle can be redirected by updating its program, the glider may be used to follow water column characteristic interfaces, such as sound velocity (density) interfaces detected during an earlier survey to define the boundaries of these interfaces and to monitor movement of the interfaces. For example, the autonomous underwater vehicle enables sound velocity gradients to be followed so as to obtain the most information from the shortest travel distances. In many applications, the programmed trajectory may be updated iteratively based on local feedback from the survey vessel.

In another embodiment, the autonomous underwater vehicle can be used to follow a sound velocity gradient or a water mass boundary based on internal local measurements. The measurements are translated to steering commands that drive the autonomous underwater vehicle in a direction that is desired. For example, if the wall of an eddy is to be mapped, the autonomous underwater vehicle can be used to seek the water column salinity and temperature interface values that define the wall or boundary. The autonomous underwater vehicle also can be used to monitor the presence and location of marine mammals in the survey area to conform to local regulations that may affect seismic operations. For example, the autonomous underwater vehicle can be programmed to move up and down at edges of the survey area or at other/additional strategic locations to detect marine mammal sounds by hydrophones. Data on the marine mammals can then be relayed back to a surface vessel or other collection location.

Referring generally to FIG. 1, an autonomous underwater vehicle 20 is illustrated according to an embodiment of the present invention. In this embodiment, vehicle 20 is illustrated as following a desired trajectory 22 through a water column 24 of a seismic survey area 26. Although autonomous underwater vehicle 20 may be designed in a variety of configurations, one example is the illustrated glider 28 that can be programmed to glide along the desired trajectory 22.

In the embodiment illustrated, the autonomous underwater vehicle 20 (e.g., glider) comprises an outer shell or hull 30 that is hydrodynamically designed to have a low coefficient of drag as the vehicle moves through the water. The autonomous underwater vehicle 20 also may comprise a control system 32, such as a processor base control system, powered by a suitable battery 34. By way of example, battery 34 may comprise a battery pack movable along an internal structure 36 to adjust the balance/inclination of the autonomous underwater vehicle 20. Additionally, wings 38 are mounted to extend from shell 30 in a manner that helps control the gliding of vehicle 20 along trajectory 22. A plurality of stabilizer fins 40 may be attached to a tail section 42 of shell 30 to further stabilize the movement of vehicle 20 along desired trajectories 22. Additionally, further control over autonomous underwater vehicle 20 can be achieved by selectively inflating and deflating a bladder 44 to change the buoyancy of vehicle 20. The bladder 44 may be inflated, for example, to cause vehicle 20 to surface for transmission of data to or from a surface vessel.

Transmission of data from autonomous underwater vehicle 20 to a surface location, e.g. a surface vessel, and transmission of data to vehicle 20 can be accomplished via an antenna 46 couple to a suitable transceiver 48 which, in turn, is connected to control system 32. By way of example, antenna 46 may be mounted to extend from tail section 42. Accordingly, when bladder 44 is inflated to cause vehicle 20 to surface, antenna 46 extends above the water line to facilitate transmission of data. It should be noted, however, that underwater data transmission techniques also can be utilized. Additionally, control system 32 can be designed to exercise automatic control over the movement of vehicle 20. For example, control 32 may comprise a proportional integral derivative (PID) controller that can be used to respond to sensed characteristics in the water column. In some applications a PID controller or other suitable controller is used to follow a gradient, edge, boundary, or other phenomenon in the water column.

The data on water column characteristics is detected via sensors 50 that are coupled to control system 32. For example, one or more sound velocity sensors 52 may be used to monitor one or more characteristics indicative of the sound velocity at various regions of the water column 24 as vehicle 20 progresses along desired trajectories 22. By way of example, the sound velocity sensors 52 may comprise density sensors able to detect the varying density of the water and water column 24. However, additional or other types of sensors also can be employed to detect characteristics indicative of sound velocity at specific positions along each trajectory 22. Other types of sensors 50 also may be used to collect other data throughout the seismic survey area 26. For example, sensors 50 may comprise one or more hydrophones 54 and/or accelerometers 56. By way of example, sensors 54 and 56 can be used to monitor noise levels in the seismic survey area to aid in the design of filters better able to enhance the signal to noise ratio in filtered streamer data obtained during the actual seismic survey.

Figure 2:
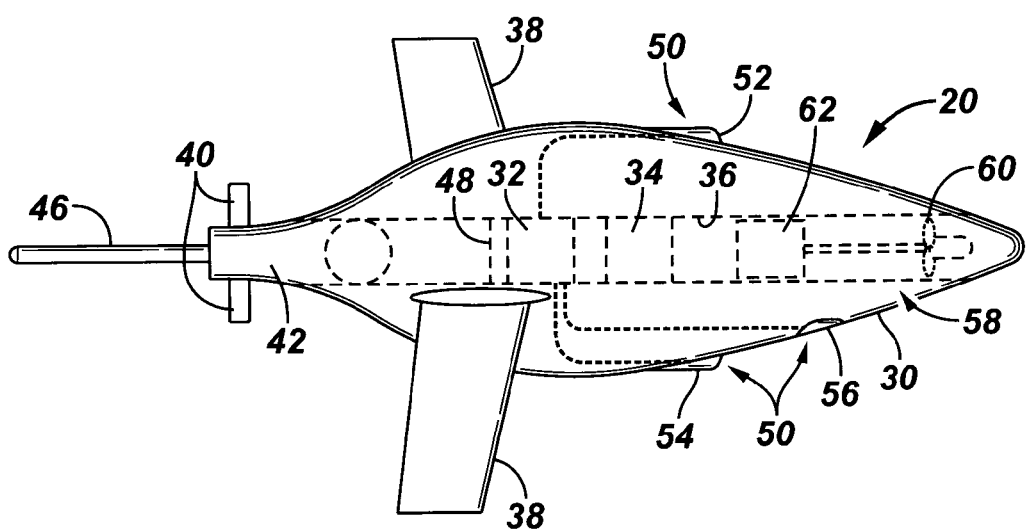
FIG. 2 is a schematic view of another example of an autonomous underwater vehicle, according to an alternate embodiment of the present invention.

The autonomous underwater vehicle 20 may have a variety of other configurations and incorporate additional or alternate components. In FIG. 2, for example, an alternate embodiment of autonomous underwater vehicle 20 is illustrated with a charging system 58 designed to enhance the life of battery 34. In this example, an impeller 60 is coupled to a generator 62 to charge battery 34. As autonomous underwater vehicle 20 descends along a desired trajectory 22, water flows through impeller 60 to rotate the impeller and power generator 62. The generator 62 outputs current to battery 34 to charge the battery for longer battery life during operation of the various systems on autonomous underwater vehicle 20. However, charging system 58 also facilitates the use of battery 34 to power an optional propulsion system that can be used to move vehicle 20 through water column 24.

Figure 3:
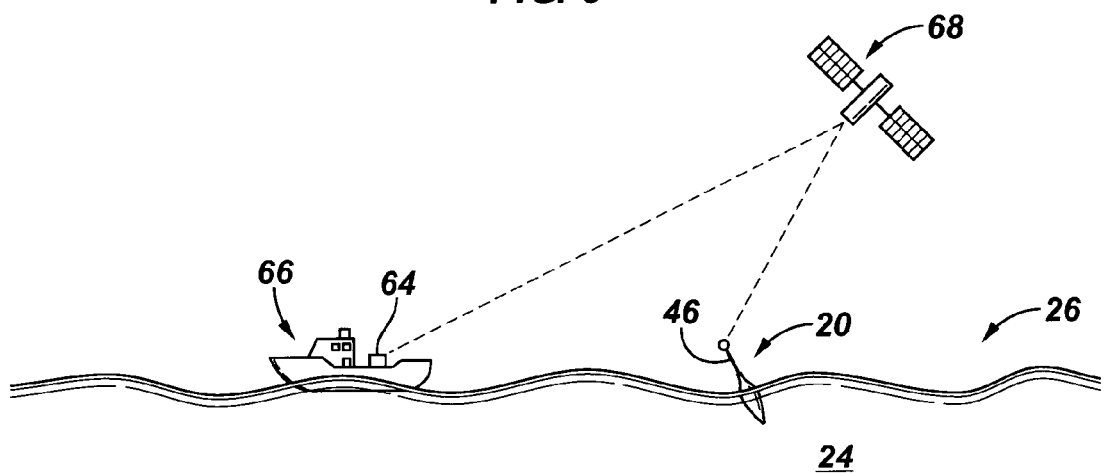
FIG. 3 is a schematic illustration representing the transfer of data between the autonomous underwater vehicle and a surface vessel, according to an embodiment of the present invention.

As illustrated in FIG. 3, autonomous underwater vehicle 20 can be designed to communicate with a surface control system 64 located on, for example, a surface vessel 66. Surface vessel 66 may comprise one of the seismic survey vessels or an independent vessel for use in obtaining data from vehicle 20 and for controlling the movement of vehicle 20 through water column 24. In the embodiment illustrated, autonomous underwater vehicle 20 communicates with surface control system 64 via a satellite communication system 68. As described above, bladder 44 may be inflated to increase the buoyancy of vehicle 20 and to move the vehicle to the surface such that antenna 46 extends through the surface of the water, as illustrated.

The autonomous underwater vehicle 20 also can be moved to the surface to facilitate retrieval. Retrieval may be accomplished by monitoring movement of vehicle 20 with onboard positioning systems, as described above. Additionally, or in the alternative, the vehicle 20 can utilize the satellite communication system 68 to send a GNSS fix via satellite after surfacing. A homing beacon signal system also can be incorporated into the vehicle 20 and a homing beacon signal can be used as a primary or backup locator. In addition to being a locator, the relationship can be reversed so the retrieval platform emits a homing beacon signal to bring the autonomous underwater vehicle 20 home. This allows the retrieval platform to continue with its primary mission profile until the autonomous underwater vehicle is close enough to be retrieved.

Figure 4:
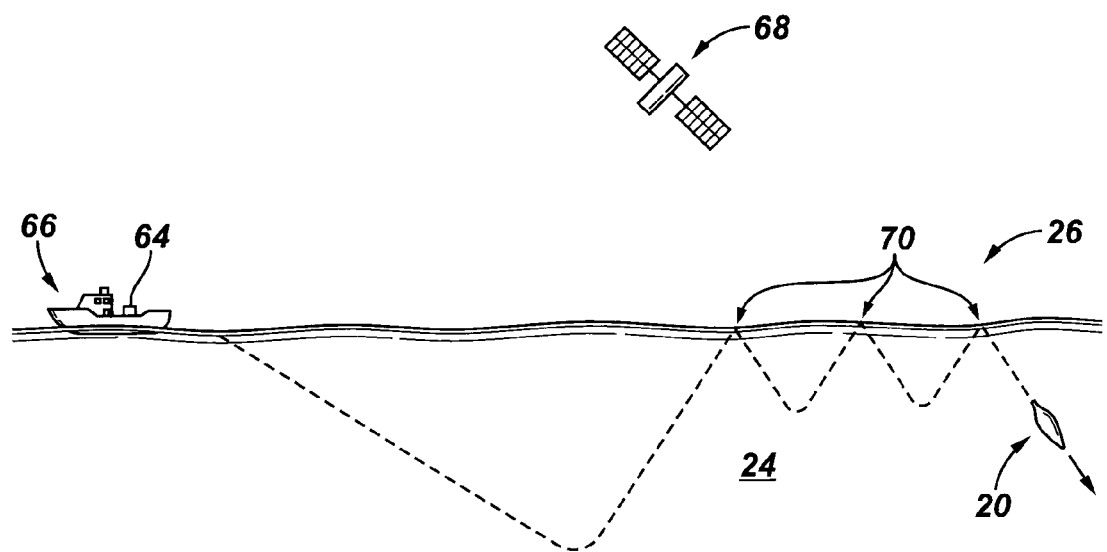
FIG. 4 is a schematic illustration representing ongoing adjustment to the trajectories traveled by the autonomous underwater vehicle, according to an embodiment of the present invention.

By utilizing satellite communications system 68 or another suitable communication system, data can be repeatedly sent to autonomous underwater vehicle to adjust the trajectory or trajectories of vehicle 20 during operation without retrieval of the vehicle, as illustrated in FIG. 4. For example, surface control 64 may be used in cooperation with communication system 68 to send new program instructions to autonomous underwater vehicle 20 at each surfacing location 70. The updating of program instructions and the changes to trajectory can be conducted on an iterative basis to pursue desired underwater regions or phenomena. For example, the program instructions controlling trajectory 22 can be updated to enable vehicle 20 to follow or otherwise explore a sound velocity interface in water column 24.

In an application where the autonomous underwater vehicle 20 is following a boundary defining a water column characteristic, e.g. a current boundary, one method for obtaining the coordinates of the boundary is by tracking the autonomous underwater vehicle from vessels engaged in acquiring seismic data. This can be achieved with various acoustic positioning systems, including long baseline systems, short baseline systems, ultra short baseline systems and other suitable systems. The trajectory of the vehicle 20 also may be transmitted back to the vessel during surface visits, as described above. In the latter application, the trajectory can be determined by dead reckoning between GNSS fixes.

In some of these applications, the processing system 32 of vehicle 20 can be used to compute the coordinates of the vehicle. For example, hydrophones 54 can be positioned on the autonomous underwater vehicle 20 at specific geometries and separation distances to enable operation of a short baseline system or an ultra short baseline system type of positioning system. If the depth measurement is known, two or more hydrophones 54 can be used to enable determination of position. Otherwise, three or more hydrophones are positioned on vehicle 20 with sufficient separation to measure the phase difference between an acoustic wave transmitted by a transmitter on a home platform, such as a transmitter on surface vessel 66. If the acoustic signal has the coordinates of the transmitter modulated on it, the internal processing system 32 of the vehicle 20 can compute its own coordinates. The coordinates can be stored and/or used in making steering decisions. For example, decisions can be made to steer toward the transmitter or to steer according to a planned trajectory.

The trajectory of the autonomous underwater vehicle 20 can be selected/designed to acquire, for example, water current and sound velocity information as near in time is practically possible to the passage of the survey spread through the same survey area. This approach enables very accurate positioning of the survey spread equipment. Based on mapping of the current regime revealed by the autonomous underwater vehicle trajectories, the data acquisition can be adapted to obtain the optimum spread element positions for time lapse surveys.

Based on the trajectory of the autonomous underwater vehicle 20, the current can be mapped in the survey area. This current information can be combined with other information, such as acoustic Doppler current profiler current meter data, to be used as input to a local current model. The current model predicts current in areas where no measurements are available but that will be traversed by the seismic spread. The predictions enable various control algorithms used by the spread control elements to anticipate what steering commands should be sent to the steering apparatus to optimize the trajectory of the seismic spread for geophysical objectives, such as coverage and time lapse repeatability.

During movement of autonomous underwater vehicle 20 through water column 24, the position of the vehicle is tracked and the data obtained is stored for transmission to surface control 64. For example, the data obtained may be transmitted to surface control 64 for further analysis during surfacing of vehicle 20. Knowledge of water column characteristics can be used to facilitate and improve analysis of seismic data obtained during corresponding seismic surveys of the seismic survey area 26. By way of a specific example, data can be accumulated on the varying sound velocity through water column 24, and this knowledge is then used in subsequent data processing to improve the quality of the final image generated from seismic data obtained during the corresponding seismic survey. A more detailed knowledge of the varying sound velocity through the water column as a function of depth, position and time can further improve the final image.

The sound velocity data and/or other water column characteristic data may be utilized in a variety of applications. For example, sound velocity data can be used by surface control 64 or other suitable processing systems in the computation of "static" (i.e., time shift) corrections applicable to the seismic data obtained during a corresponding seismic survey of the seismic survey area 26. When sound velocity through the water column varies, the travel time of the seismic arrivals during the seismic survey also varies and results in undesired time shifts on the seismic data. In 3D surveys, varying sound velocity through the water can cause significant errors that require correction.

In one application, data from one or more autonomous underwater vehicles 20 is used to adjust the seismic survey spread elements. Initially, the coordinates of the autonomous underwater vehicle or vehicles is obtained. As described above, a variety of methods can be used to obtain the coordinates, including instrumentation aided dead reckoning or acoustic positioning techniques. One or both of control system 32 and surface control 64 is used to process collected data and to separate, for example, current direction and amplitude of force from lift induced forces at the autonomous underwater vehicle. Based on the processed data, various adjustments can be made to steering control spread elements to optimize the spread element trajectory for specific geophysical objectives. Examples of adjustments include surface vessel rudder adjustments, qfin wing adjustments, source steering adjustments, and winch adjustments. The trajectories of the autonomous underwater vehicles can be optimized to determine currents ahead of the seismic spread and to provide the most recent and accurate current regime.

By utilizing autonomous underwater vehicles 20, e.g. gliders, data with a greater level of detail is obtained and applied in computing the static corrections. The vehicles 20 can be used to fully sample the water column in both space (X and Y positions) and in depth. Consequently, more accurate and locally specific corrections can be applied to the seismic data. Additionally, the vehicles 20 can be used over time to continuously sample the water column and to detect ongoing changes in the sound velocity for continued correction of the seismic data.

In a related application, the static corrections are used on surface control 64 or another suitable system in the processing of time-lapse data. The static corrections can be particularly important when processing time-lapse data because small changes in the seismic response are easily masked by time shifts. By utilizing the detailed data/information provided by vehicles 20, the time-lapse images that are constructed based on the seismic data can be significantly improved.

In other applications, the autonomous underwater vehicles 20 are used to obtain sufficient data to construct a water sound velocity model. In creating very high resolution images, for example, the "static" time corrections may not be sufficient to create the desired image. In this situation, the data obtained by vehicles 20 can be used in constructing the water sound velocity model, and the model can be directly incorporated in either re-datuming the seismic data or in the imaging step itself.

As described above, one or more autonomous underwater vehicles 20 can be used to obtain other types of data. For example, additional sensors 50, such as hydrophones 54 and/or accelerometers 56, may be incorporated into vehicle 20 to record seismic data. The seismic data recorded by the autonomous underwater vehicle 20 is used to complement the seismic data recorded conventionally during a corresponding seismic survey. For example, with a stationary seismic source recorded by a slowly moving autonomous underwater vehicle 20 (e.g., glider), a fully sampled "shot-domain" record can be recorded. Sampling seismic signals with varying depth also can add value to seismic data that emphasizes different frequency content. The additional sampling is not limited by conventional spread dimensionality or by the cost of operating a seismic vessel to obtain higher crossline sampling density. Depending on the specific application, the complementary seismic data obtained by the glider or other autonomous underwater vehicle can be used to supplement the seismic data in a variety of analyses. As described above, hydrophones can be incorporated into the autonomous underwater vehicle 20 for recording the sound of marine mammals and for detecting the presence of those mammals (e.g., whales). One operational mode for autonomous underwater vehicles 20 is as virtual buoys. In this mode, the autonomous underwater vehicles rise and fall in the same vertical space with no significant horizontal motion. The vehicles 20 can be arranged around the periphery of the survey area and can be used to detect and triangulate to marine mammals.

The detection of marine mammals can be carried out by vehicle 20 simultaneously or separately with respect to other vehicle functions (e.g., determining sound velocities and current mapping within the survey area). In some applications, one or more additional hydrophones 54 can be appropriately designed and mounted on autonomous underwater vehicle 20 to capture the range of frequencies expected from marine mammals. The additional hydrophones 54 are fitted into vehicle 20 together with dedicated processing system 32 and other sensors 50, such as the sound velocity and position determination sensors. This allows each vehicle 20 to operate as multifunctional vehicle in the survey area during seismic acquisition.

If the signal of a marine mammal (e.g., whale) has a frequency high enough so that the separation of the hydrophones 54 allow vehicle 20/processing system 32 to measure the signal phase difference, the marine mammal can be positioned relative to the vehicle. It should also be noted that in contrast to hydrophones used in streamers of the survey spread equipment, the hydrophones 54 can be specifically designed to capture the frequencies of whales or other marine mammals. In marine mammal detection applications, the vehicles 20 may be located away from the survey spread equipment to locate marine mammals and to predict their movements. The data obtained can then be used for line planning with respect to the survey spread equipment to avoid marine mammals that would otherwise travel through the survey area.

In operation, the autonomous underwater vehicles 20 may be used in a variety of ways to improve the usefulness of seismic survey data. In one operational example, each autonomous underwater vehicle 20 is initially programmed to glide or otherwise move along a set trajectory, as illustrated by block 72 of the flowchart illustrated in FIG. 5. The vehicle 20 is then released to glide along the desired trajectory, as illustrated by block 74, and to collect data on water column characteristics until resurfacing, as illustrated by block 76. While at the surface, data may be transmitted from vehicle 20 to surface control 64 located on, for example, surface vessel 66; and data also may be sent from surface control 64 to vehicle 20. For example, new program instructions can be sent to vehicle 20, as illustrated by block 78. Based on the new program instructions, the trajectory is revised so that vehicle 20 glides along a new trajectory, as illustrated by block 80. Upon completion of the trajectory, the autonomous underwater vehicle resurfaces, as illustrated by block 82, for the transfer of data to or from surface control 64. This process can be used as an iterative process and repeated until the desired data on the water column 24 is obtained, as illustrated by block 84.

In a specific application, the autonomous underwater vehicle 20 (or vehicles) is used to collect data on sound velocities in a marine survey area, as indicated by block 86 of FIG. 6. For example, appropriate sensors 50 may be used to monitor water density or other characteristics indicative of sound velocity at that particular position within the survey area. As the movement of vehicle 20 is tracked along trajectories 22 through the marine survey area, the vehicle 20 is able to determine changes in sound velocities throughout the area, as indicated by block 88. A seismic survey also is conducted in the marine survey area, as indicated by block 90. The seismic survey may be conducted immediately following the collection of data by autonomous underwater vehicle 20, or the seismic survey can be conducted while the vehicle 20 is collecting data or prior to the collection of data by vehicle 20. The data on changes in sound velocities in the marine survey area is used to adjust the seismic survey data, as indicated by block 92. The adjustments to the seismic survey data can be performed on surface control system 64 according to various programs and/or models as discussed above.

However, autonomous underwater vehicle also can be used in the detection and/or monitoring of a variety of water column characteristics, as indicated generally by the flowchart example of FIG. 7. In this general example, one or more autonomous underwater vehicles 20 are initially deployed, as indicated by block 94. Depending on the sensors incorporated into vehicles 20, the vehicles can be used to detect one or more desired water column characteristics, as indicated by block 96. The ability to continually update or change the trajectory of the autonomous underwater vehicles enables an operator to locate characteristic interfaces in the water column, as indicated by block 98. The interfaces can then be explored or followed to collect detailed data on the extent and location of the interface, as indicated by block 100. In some applications, the interface data and other data collected from the autonomous underwater vehicles 20 is used to prepare a map of the characteristics throughout the seismic survey area, as indicated by block 102. The map created and/or the other data obtained by the autonomous underwater vehicles 20 then may be used to improve the accuracy of the actual seismic survey, as indicated by block 104.

Generally, the autonomous underwater vehicles 20, e.g. gliders, may be used in cooperation with conventional survey vessels to enable more frequent data exchange and trajectory updates. Additionally, the vehicles 20 may be combined with a variety of other sensors and components that enabled the collection, monitoring, and/or transfer of data with processing centers. For example, the vehicles 20 may be fitted with seismic data recording sensors to both complement conventional acquisition and to acquire seismic data independently. The autonomous underwater vehicles 20 also may be used in a wide variety of applications, including the detection and/or mapping of varying sound velocities through a seismic survey area. It should further be noted that the size shape and structure of the vehicle 20 can be adjusted for various factors, including glide distance, environment, vehicle components, obstacles, and other factors that can affect the function of autonomous underwater vehicles 20. A variety of techniques also can be used to determine or track the position of the vehicles 20 in the water column, as discussed above. In many applications, the vehicles 20 are able to glide while collecting data. However, propulsion systems also may be incorporated into the autonomous underwater vehicle to facilitate travel throughout the seismic survey area.

Figure 8:
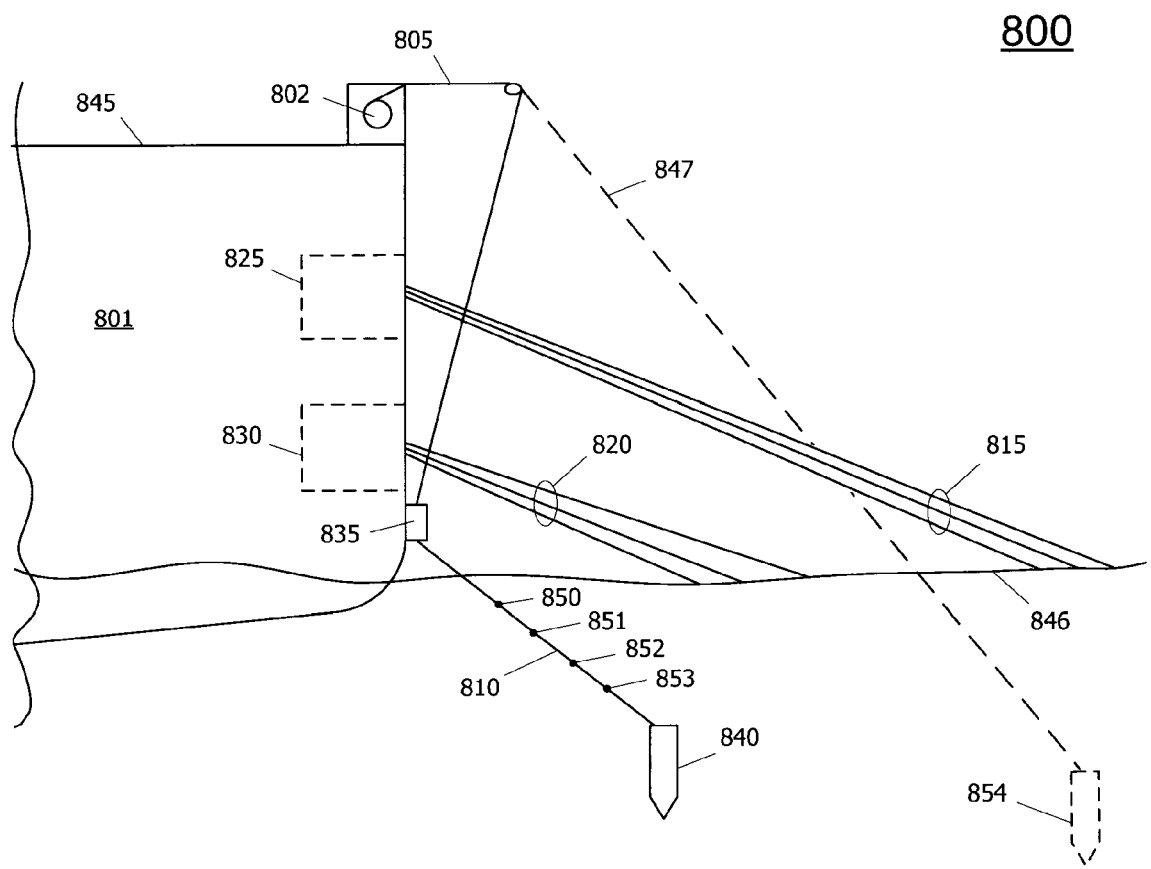
FIG. 8 includes an embodiment of a cable guide system in an embodiment of the invention.

Embodiments of the invention are not limited to autonomous underwater vehicles. For example, an embodiment concerns a probe that couples to a seismic vessel via a tow cable. As addressed above, when deploying probes from a seismic vessel that is towing source arrays and streamers, the probe and/or its tow cable can tangle or collide with elements of the towed seismic spread. In FIG. 8, cable guide 835 is used to lessen the risk for such entanglement. Vessel 801 includes outside decks 845, 825, 830. Seismic source lines 820 are towed from deck 830. Streamer lines 815 are towed from deck 825. Decks 825, 830 constitute valuable and congested deck space. To avoid further crowding decks 825, 830 winch 802 is located on deck 845. Dashed line 847 indicates a probe cable extending to probe 854, albeit through and among source lines 820 and streamer lines 815. Such an arrangement increases the risk for entanglement between any or all of lines 815, 820, 847 and probe 854. However, in an embodiment of the invention guide 835 routes probe cable 810 from winch 802 and boom 805 to or near water surface 846 and to probe 840. Placing guide 835 near the water surface helps keep probe cable 810 deep and away from lines 815, 820. Embodiments of the invention are not limited to a vessel with any specific number of decks and are also not limited by whether seismic array tow lines are towed from any specific location on a vessel.

Examples of such physical guides are varied. For example, guide 835 may include a conduit, pipe, donut, channel, conductor, duct, flume, tube, track, corridor, and/or passage arranged to guide the probe cable away from the seismic array. A pulley or wheel may couple to the guide to help reduce friction on line 810 as the line moves due to winch 802 and/or movement (e.g., free fall or propulsion) of probe 840. Cable 810 itself may be coated with a low friction coating to ease friction and prolong cable life. Also, referring to cable 810 as tow cable may not necessarily mean all embodiments require probe 840 be towed. Cable 810 may lend only structural coupling to probe 840 but, in some embodiments, may also include power and/or data lines (e.g., communication). Power may be used to activate steering fins and/or propulsion mechanisms (e.g., impeller, propeller, and the like).

Guide 835 may be located in several locations such as at or near water surface 846 or below any upper decks (e.g., 825, 830) that deploy seismic array cables 815, 820. Guide 835 may extend below water surface 846, and possibly even below vessel 801, and may include a foil profile to decrease water resistance. Such an orientation will give cable 810 a more vertically inclined orientation until the cable is in the water and increase the effective deployment depth to below the water line and perhaps deeper than the vessel hull bottom.

In an embodiment, guide 835 may include a birth or passage, such as a diameter of a conduit, which is wider than probe 840. This will allow probe 840 to be raised all the way to boom 805, which may swivel or be otherwise capable of moving a retrieved probe onto a deck. In an embodiment, multiple guides may be stationed along vessel 801 such as, for example, between decks 825, 830 and even between decks 825, 845. Doing so may allow one to guide cable 810 along the left or right edge of the stern of vessel 801, thereby avoiding cables 815, 820. In an embodiment, guide 835 itself may be raised or lowered to winch 802.

In an embodiment, cable 810 may couple to a probe such as probe 20 in FIG. 1 or 2. For explanation purposes, at times a probe may be interchangeably referred to as probe 20 (FIG. 1-4) or 840 (FIG. 8) but such descriptions should not be interpreted as limiting embodiments to any one probe. Cable 810 may couple to probe 20 at any location such as, the front, back, bottom, or top surfaces of probe 20. Antenna 46 may be positioned accordingly (e.g., internal to shell or case 30) to avoid contact with cable 810. Thus, probe fins 38 may be controlled to steer probe 20, and cable 801, away from obstacles such as lines 815, 820. As noted above, fins 38 may be maneuvered to adjust the vertical (i.e., depth or Z) and horizontal (X and Y) locations of probe 20. Furthermore, bladder 44 may be inflated/deflated to position probe 20 and cable 801 away from obstacles. As further indicated above, device 20 may include propulsion mechanisms (e.g., powered propeller and/or impellar systems) as well to further aid navigating probe 20.

In an embodiment, probe 20 includes sensor 52, which may detect depth, and depth keeping wings 38. Wings 38 and/or 40 may be used to steer probe 20. Demanded depth may be a function of the amount of cable 810 deployed from winch 802 ("cable out"). Cable out may be measured at winch 802 and depth may be measured by pressure sensor 52. These two data points (from cable out and from depth recordings) may be used separately or combined to bring probe 20 to a desired depth via corresponding depth control commands implemented via control 32. Probe 20 may include a processor for computing the desired depth (e.g., control system 32) or such a system can be located aboard vessel 801 or some chase vessel. Control system 32 may be programmed to keep probe 20 at least, for example, twenty meters below surface 846 assuming seismic gun sources may be ten meters below surface 824. Thus, fish 20 will remain deeper than the deepest seismic spread element to avoid collision with such elements. The ability to stay at that predetermined depth may be implemented automatically via control system 32. In other words, fish 20 may automatically stay a certain distance below or aside any element of the tow seismic array.

Again, probe 20 (also referred to as fish 20) itself is not the only collision risk. Tow cable 810, through which communications and/or power to winch 802 and data controllers on vessel 801 may occur in certain embodiments, may also come in contact with the seismic spread elements. However, controlling fish 20 as described above (in both the vertical and horizontal directions) can also control cable 810 location in the water column with respect to seismic spread elements 815, 820 and the associated guns and/or streamers.

In order to know where to locate fish 20 to ensure cable 810 is steered away from obstacles, a physical model can be used to estimate the cable location and shape based on the depth of the towed fish or probe.

Also, various positioning devices can be incorporated into the probe to allow real time monitoring of its trajectory for obstacle avoidance. Sensor 52 (e.g., a pressure or depth sensor) is a positioning device in the vertical direction. Two or more hydrophones 54 and accelerometers 56 located in fish 20 can receive acoustic signals to compute phase or time of arrival differences with respect to an acoustic transmitter used to position the fish. Using phase or time differences, for example, enables estimates of the range and angles of fish 20 with respect to the transmitter. Embodiments of such communication systems are addressed further above. One or more transmitters can be located anywhere in the seismic spread (e.g., connected or coupled to a streamer or gun line) where the coordinates of the transmitters are known with adequate accuracy to give a useful relation between fish 20 and the spread elements. An ideal example of this positioning mechanism is if transmitters in an array transmit an acoustic signal to fish 20. These transmitters have coordinate estimates resulting from the network adjustment that occurs at every positioning cycle, such as every acoustic shot cycle. The geometry and proximity of the transmitters in the seismic spread is very favorable for positioning the tow fish when it is in most danger of coming in contact with the spread elements.

Also, fish 20 may include a sonar device to detect obstacles (e.g., seismic array, underwater obstructions, marine life, and the like) in the water column and compute its proximity to those. Combined with lateral and vertical position controlling mechanisms, knowledge of proximity to obstacles can allow towed fish 20 to actively avoid collisions.

Figure 9:
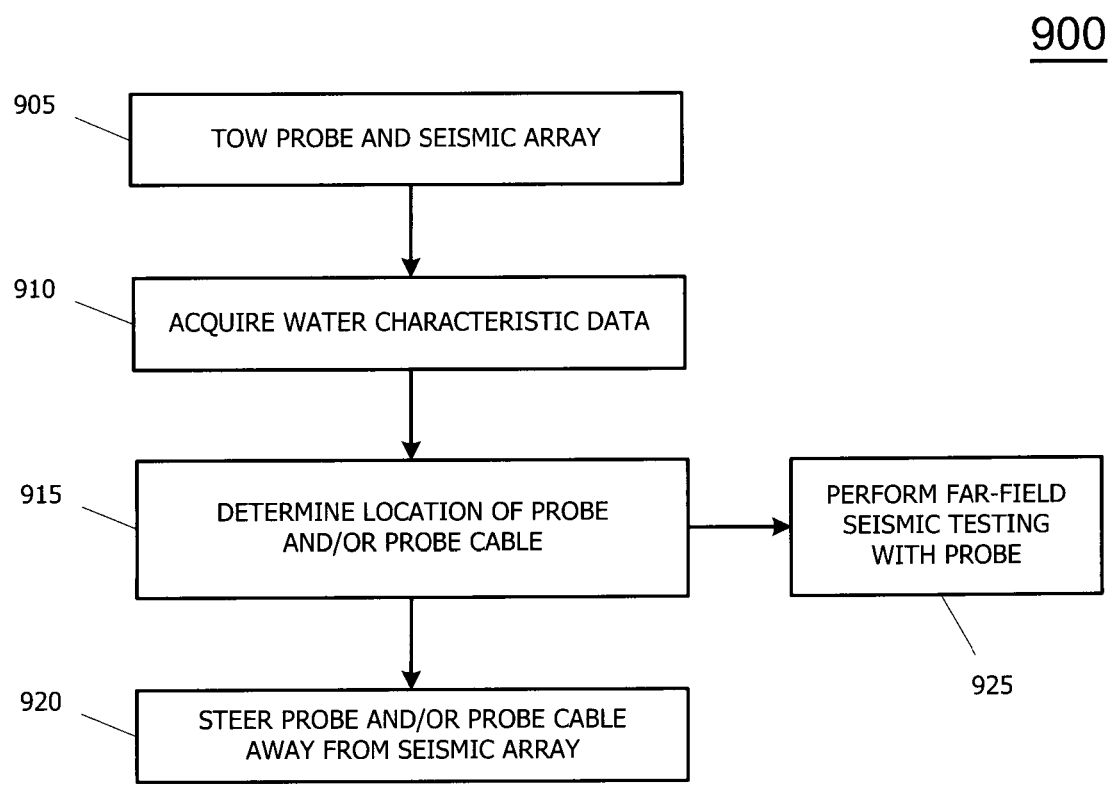
FIG. 9 includes a flowchart illustrating an example of a methodology for steering a probe in an embodiment of the invention.

FIG. 9 includes a flowchart illustrating an example of a methodology for steering a probe in an embodiment of the invention. For explanation purposes, elements from FIGS. 1-8 are used to illustrate method 900. Block 905 includes towing a probe assembly, which includes probe 840 and probe cable 810, and a seismic array from seismic vessel 801, which is underway (i.e., making self-driven progress through the water; not at anchor, aground, or made fast to the shore). Probe cable 810 couples probe 840 to seismic vessel 801. Probe cable 810 is deployed into the water via cable guide 835, which couples to seismic vessel 801 near water surface 846 and below lowest outside deck 830 included in the stern of seismic vessel 801. The seismic array includes streamers, seismic source guns, and cables 815, 820 coupling the streamers and seismic source guns to seismic vessel 801.

Block 910 includes acquiring water characteristic data, via probe 840, while seismic vessel 801 is advancing, under its own power, and actively towing the seismic array. In other words, method 900 allows a ship to sample water characteristic while actively towing a seismic spread. Thus, rather than remain idle or adrift while determining water characteristic data, vessel 801 can "actively tow" the seismic spread while collecting water characteristic data, as typically occurs during or between acoustic pulsing during maritime seismic testing. Water characteristic data may be varied and may include, for example, density, temperature, salinity, and depth data—all of which may be used to determine sound velocity and may be determined using sensor or sensors 50. The water characteristic data may allow a party to better determine how sound velocity in the water layer may vary laterally and vertically (e.g., due to spatial variations and vertical gradients in temperature and salinity), as well as with calendar time.

In an embodiment, acquiring the water characteristic data may include repeatedly allowing the probe to free-fall below the water surface and then raising the probe towards the water surface. These free-falls can last varying amounts of time such as 1, 5, 10 minutes and more. During the cycles of free-fall and retrieval, embodiments may be used to determine the location of probe 840 and automatically alter the navigation module to maintain probe 840 at least a predetermined distance away from the seismic array.

Block 915 includes determining a location of a portion of the probe assembly, where the assembly includes probe 840 and probe cable 810, while the seismic array is being actively towed and probe 840 is submerged below water surface 846 (and not visible to those standing on decks 845, 825, 830). In an embodiment, determining the location of the portion of the probe assembly may include determining the depth of probe 840. However, determining the location of the portion of the probe assembly may include determining the depth of probe cable 810. Other location determining embodiments are discussed above and include methods involving acoustic (e.g., interplay between transmitters or transceivers in seismic array or coupled to vessel 801), radio-frequency, satellite (e.g., GPS), and/or communications via hardwired lines in cable 810.

In an embodiment, determining the location of a portion of the probe assembly may include determining a location of a portion of probe cable 810 based on communications with communication modules 850, 851, 852, 853 staggered at intervals along probe cable 810. A processing system, such as system 32 of vehicle 20, can be used to compute the coordinates of the cable communication modules 850, 851, 852, 853 and, as a result, the portions of cable 810 where those modules are located. For example, modules 850, 851, 852, 853 may include hydrophones at specific geometries and separation distances to enable operation of a short baseline system or an ultra short baseline system type of positioning system. If the depth measurement is known, two or more hydrophones 54 can be used to enable determination of position. Otherwise, three or more hydrophones are positioned on cable 810 with sufficient separation to measure the phase difference between an acoustic wave transmitted by a transmitter on a home platform, such as a transmitter on, for example, surface vessel 801, a streamer included in the seismic spread, or even in probe 20. If the acoustic signal has the coordinates of the transmitter modulated on it, a processing system located aboard vessel 801 or within probe 20 can compute coordinates of the relevant portions of cable 810. The coordinates can be stored and/or used in making steering decisions. For example, decisions can be made to steer probe 20 toward the transmitter or away from the transmitter (e.g., automatically or based on newly received navigation path from an operator), thereby moving probe 840 and/or cable 810 towards or away from portions of the seismic spread and/or vessel 801. In one embodiment, by locating modules 850, 851, 852, 853 not immediately adjacent the probe, one can monitor where particular portions of cable 810 are located. For example, cable portions that might surface 100-300 meters aft of vessel 801 may be too close to seismic guns located in that same area. Thus, cable portions likely to be in this area may be candidates for communications modules such as transmitters, receivers, transceivers, and the like.

Block 920 includes, based on the determined location of the portion of the probe assembly from block 915, altering a navigation module, included in probe 840, to consequently steer probe 840 away from a portion of the seismic array. In an embodiment, altering the navigation module to steer the probe includes changing a buoyancy of buoyancy bladder 44 included in probe 20. In an embodiment, altering the navigation module to steer the probe includes changing a deflection angle of steering fin 38 and/or steering fin 40. Embodiments may include using propulsion mechanisms in probe 20 to "actively propel" probe 20 (i.e., not relying on drift, current, or free-fall activity) to a desired direction or location. The propulsion mechanism may couple to a power source located, for example, within the probe or aboard the seismic vessel (e.g., supply power from vessel to probe via cable 810). Also, by altering the navigation module to steer the probe one also may steer a portion of the probe cable (e.g., portions near modules 850, 851, 852, 853) away from the seismic array based on, for example, determining the location of a portion of probe cable 810 (e.g., portions near modules 850, 851, 852, 853).

In an embodiment, the navigation module may be altered automatically (i.e., without direct manual human intervention) to maintain probe 840 at least a predetermined distance below the seismic array and, hence, the water surface. For example, if a user typically deploys seismic guns ten meters below surface 846, based on feedback from sensors such as depth sensor 52 in probe 20 and/or modules 850, 851, 852, 853 on cable 810. As mentioned above, control system 32 of probe 20 can be designed to exercise automatic control over the movement of vehicle 20. Also as mentioned above, such control (whether automatic or non-automatic) may alter the navigation module to adjust the vertical and/or horizontal trajectory of the probe using, for example, bladder 44 and/or one or more fins 38.

In an embodiment, the system may maintain the probe at least a predetermined distance away from a portion of the seismic array (e.g., cables 820, 815, streamers, seismic guns) based on determining the length of probe cable 810 deployed from winch 802 and/or a measurement from depth sensor 52 included in probe 20.

Also, probe 840 may be steered to remove slack in towed probe cable 810. Such slack can occur due to over-rotation of winch 802, foul weather, and the like.

Block 925 includes conducting far-field seismic testing with probe 840. For example, additional sensors 50, such as hydrophones 54 and/or accelerometers 56, may be incorporated into vehicle 20 to record seismic data. The seismic data recorded by probe 20 may complement the seismic data recorded conventionally during a corresponding seismic survey. Probe 20 may be used to sample seismic signals at varying depths different from those of the various streamers. This may add value to seismic data that emphasizes different frequency content. Thus, far-field seismic testing may include inducing an acoustic pulse with the seismic source guns and recording seismic data, resulting from the acoustic pulse, with probe 20. Probe 20 may record, for example, 20, 30, 40, 50, 60, 70, 80 or more meters from the nearest seismic source gun.

Figure 10:
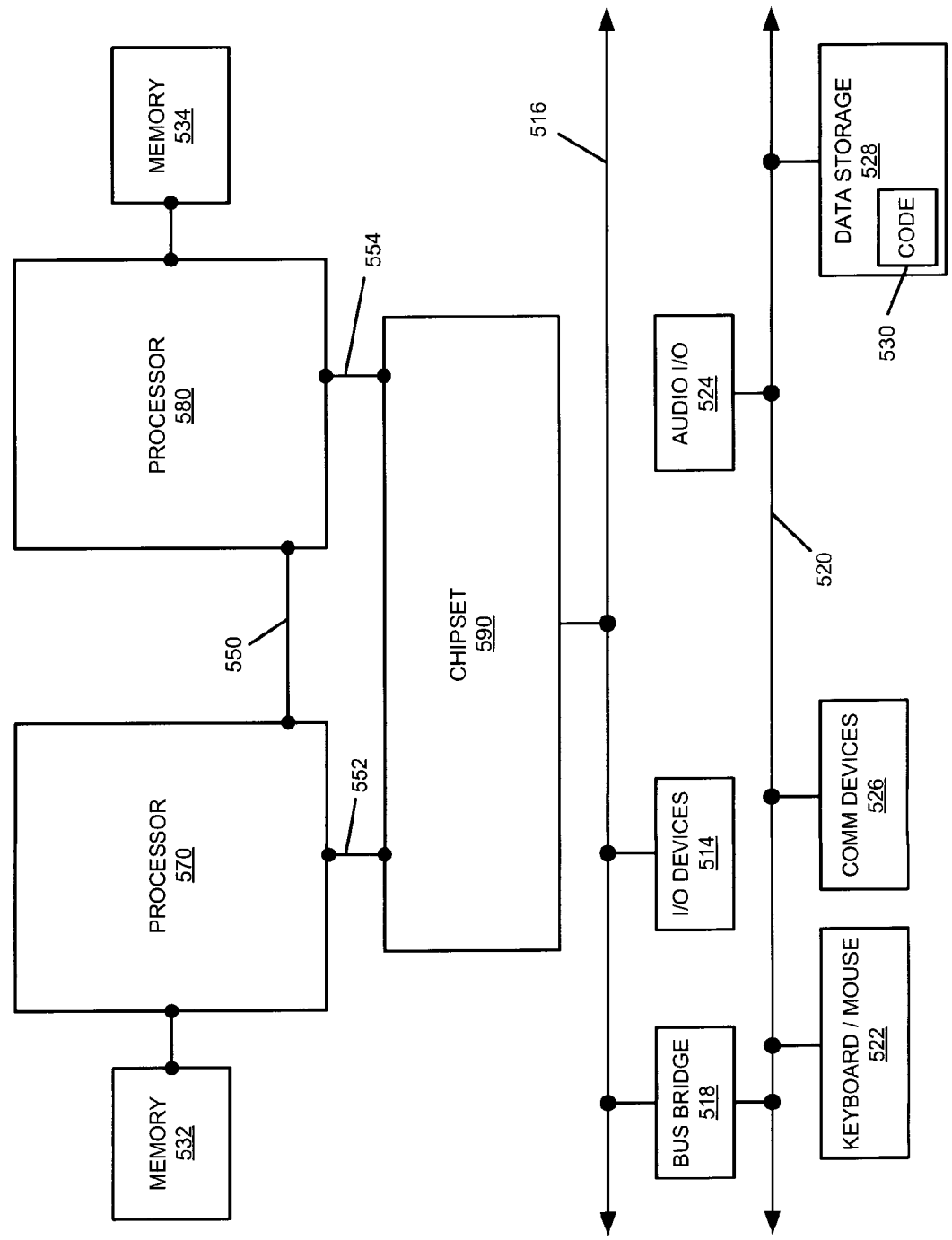
FIG. 10 includes a computer system in one embodiment of the invention.

Embodiments may be implemented in many different system types. Referring now to FIG. 10, shown is a block diagram of a system in accordance with an embodiment of the present invention. All or elements of system 50 may be included in fish 20, vessel 801, and the like. Multiprocessor system 500 is a point-to-point (P-P) interconnect system and includes first processor 570 and second processor 580 coupled via point-to-point interconnect 550. Each of processors 570 and 580 may be multicore processors. The term "processor" may refer to any device or portion of a device that processes electronic data from registers and/or memory to transform that electronic data into other electronic data that may be stored in registers and/or memory (e.g., controller). First processor 570 may include a memory controller hub (MCH) and P-P interfaces. Similarly, second processor 580 may include a MCH and P-P interfaces. The MCHs may couple the processors to respective memories, namely memory 532 and memory 534, which may be portions of main memory (e.g., dynamic random access memory (DRAM)) locally attached to the respective processors. First processor 570 and second processor 580 may be coupled to chipset 590 via P-P interconnects 552, 554 respectively. Furthermore, chipset 590 may be coupled to first bus 516 via an interface. Various input/output (I/O) devices 514 may be coupled to first bus 516, along with bus bridge 518, which couples first bus 516 to second bus 520. Various devices may be coupled to second bus 520 including, for example, keyboard/mouse 522, communication devices 526, and data storage unit 528 (e.g., disk drive or other mass storage device that includes code 530). Further, audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as DRAMs, static random access memories (SRAMs), erasable programmable read-only memories (EPROMs), flash memories, electrically erasable programmable read-only memories (EEPROMs), magnetic or optical cards, or any other type of media suitable for storing electronic instructions. Such computer-readable or computer-usable storage medium or media is (are) considered to be part of an article (or article of manufacture). An article or article of manufacture can refer to any manufactured single component or multiple components.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms. Thus, the terms "code" or "program" may be used to refer to any collection of instructions which, when executed by a processing system, performs a desired operation or operations. In addition, alternative embodiments may include processes (in code or otherwise) that use fewer than all of the disclosed operations, processes that use additional operations, processes that use the same operations in a different sequence, and processes in which the individual operations disclosed herein are combined, subdivided, or otherwise altered.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    towing a probe assembly, which includes a probe and a probe cable, and a seismic array from a seismic vessel underway in a body of water, wherein (a) the probe cable, which couples the probe to the seismic vessel, is deployed into the body of water via a cable guide that couples to the seismic vessel near the water surface of the body of water and below the lowest outside deck included in the stern of the seismic vessel, and (b) the seismic array includes cables and at least one of streamers and seismic source guns that couple to the seismic vessel via the cables;
    acquiring water characteristic data, via the probe while the seismic vessel is advancing, under the seismic vessel's own power, and actively towing the seismic array;
    determining a location of a portion of the probe assembly while the seismic array is being actively towed and the probe is submerged below the water surface; and
    based on the determined location of the portion of the probe assembly, altering a navigation module, included in the probe, to consequently steer the probe away from a portion of the seismic array;
    wherein acquiring the water characteristic data via the probe includes (a) repeatedly allowing the probe to free-fall below the water surface for longer than five minutes per free-fall and then raising the probe towards the water surface while (b) determining the location of the probe and automatically altering the navigation module to maintain the probe at least a predetermined distance away from the seismic array.

2. The method of claim 1, wherein altering the navigation module to consequently steer the probe away from the portion of the seismic array includes changing a buoyancy of a buoyancy module included in the probe.

3. The method of claim 1, wherein altering the navigation module to consequently steer the probe away from the portion of the seismic array includes changing a deflection angle of a steering fin coupled to the probe.

4. The method of claim 1, wherein determining the location of the portion of the probe assembly includes determining the depth of the probe in the body of water.

5. The method of claim 4 including automatically altering the navigation module to maintain the probe at least a predetermined distance below one of the seismic array and the water surface.

6. The method of claim 1 including automatically altering the navigation module to maintain the probe at least a predetermined distance away from the seismic array, wherein altering the navigation module includes altering the navigation module to adjust both the vertical and horizontal trajectory of the probe.

7. The method of claim 1 including determining sound velocity based on the acquired water characteristic data.

8. The method of claim 1 including conducting far-field seismic testing with the probe, the far-field seismic testing including inducing an acoustic pulse with seismic source guns and recording seismic data, resulting from the acoustic pulse, with the probe; wherein the probe is greater than 50 meters from the nearest seismic source gun.

9. The method of claim 1 including determining the probe cable is less than a predetermined distance from the seismic array and altering the navigation module, included in the probe, to consequently steer the probe and the probe cable away from the portion of the seismic array.

10. The method of claim 1, wherein determining the location of the portion of the probe assembly is based on communicating between a transmitter included in the seismic array and one of the probe and the probe cable.

11. The method of claim 1 including acquiring the water characteristic data within five minutes of both inducing an acoustic pulse with seismic source guns and recording seismic data.

12. The method of claim 1 including automatically altering the navigation module to maintain the probe at least a predetermined distance away from the portion of the seismic array based on determining one of (a) the length of probe cable deployed from the seismic vessel, and (b) a measurement from a depth sensor included in the probe.

13. The method of claim 1 including determining a portion of the towed probe cable, deployed from the seismic vessel, has un-taut slack and altering the navigation module to partially remove the slack.

14. The method of claim 1, (a) wherein determining the location of the portion of the probe assembly includes determining a location of a portion of the probe cable, which is not immediately adjacent the probe, based on communications with communication modules staggered at intervals along the probe cable, and (b) automatically altering the navigation module to steer the portion of the probe cable away from the seismic array based on determining the location of the portion of the probe cable.

15. The method of claim 1 including deploying the probe cable from a winch located on an outside deck that does not include the cable guide, wherein the outside deck is included in the seismic vessel.

16. The method of claim 1 including actively propelling the probe away from the portion of the seismic array via a powered propulsion unit that is included in the probe and coupled to a power source.

17. A machine readable non-transitory memory storage device that contains instructions that enable a processor based system to, when a probe assembly and a seismic array are actively towed from a seismic vessel, (a) acquire water characteristic data via a probe; (b) determine a location of a portion of the probe assembly; and (c) based on the determined location of the portion of the probe assembly, alter a navigation module, included in the probe, to consequently steer the probe away from a portion of the seismic array;
wherein the probe assembly includes the probe and a probe cable, the probe cable to couple the probe to the seismic vessel that is underway in a body of water and actively towing the seismic array, which includes cables and at least one of streamers and seismic source guns that couple to the seismic vessel via the cables.

18. The device of claim 17 storing instructions that enable the system to change a buoyancy of a buoyancy module, included in the probe, to consequently steer the probe away from the portion of the seismic array.

19. The device of claim 17 storing instructions that enable the system to change a deflection angle of a steering fin, included in the probe, to consequently steer the probe away from the portion of the seismic array.

20. A system comprising:
a probe assembly including a probe and a probe cable, the probe cable to couple the probe to a seismic vessel, underway in a body of water, that is actively towing a seismic array that includes cables and at least one of streamers and seismic source guns that couple to the seismic vessel via the cables; and
a probe guide, which is configured to couple to the seismic vessel near the water surface of the body of water, to deploy the probe cable into the body of water at an initial water entry point that is closer to the seismic vessel than initial water entry points for each of the cables coupling the at least one of the streamers and the seismic source guns to the seismic vessel.

21. The system of claim 20 including a controller coupled to the probe, wherein when the probe assembly and seismic array are actively towed from the seismic vessel, the controller is configured to: (a) acquire water characteristic data via the probe; (b) determine a location of a portion of the probe assembly; and (c) based on the determined location of the portion of the probe assembly, alter a navigation module, included in the probe, to consequently steer the probe away from a portion of the seismic array.

22. The system of claim 21, wherein the probe includes a buoyancy module and the controller is configured to change a buoyancy of the buoyancy module to consequently steer the probe away from the portion of the seismic array.

23. The system of claim 21, wherein the probe includes a steering fin and the controller is configured to change a deflection angle of the steering fin to consequently steer the probe away from the portion of the seismic array.

* * * * *